Dec. 1, 1931.   R. R. BOTTOMS   1,834,016
PROCESS FOR SEPARATING ACIDIC GASES
Filed Oct. 15, 1930
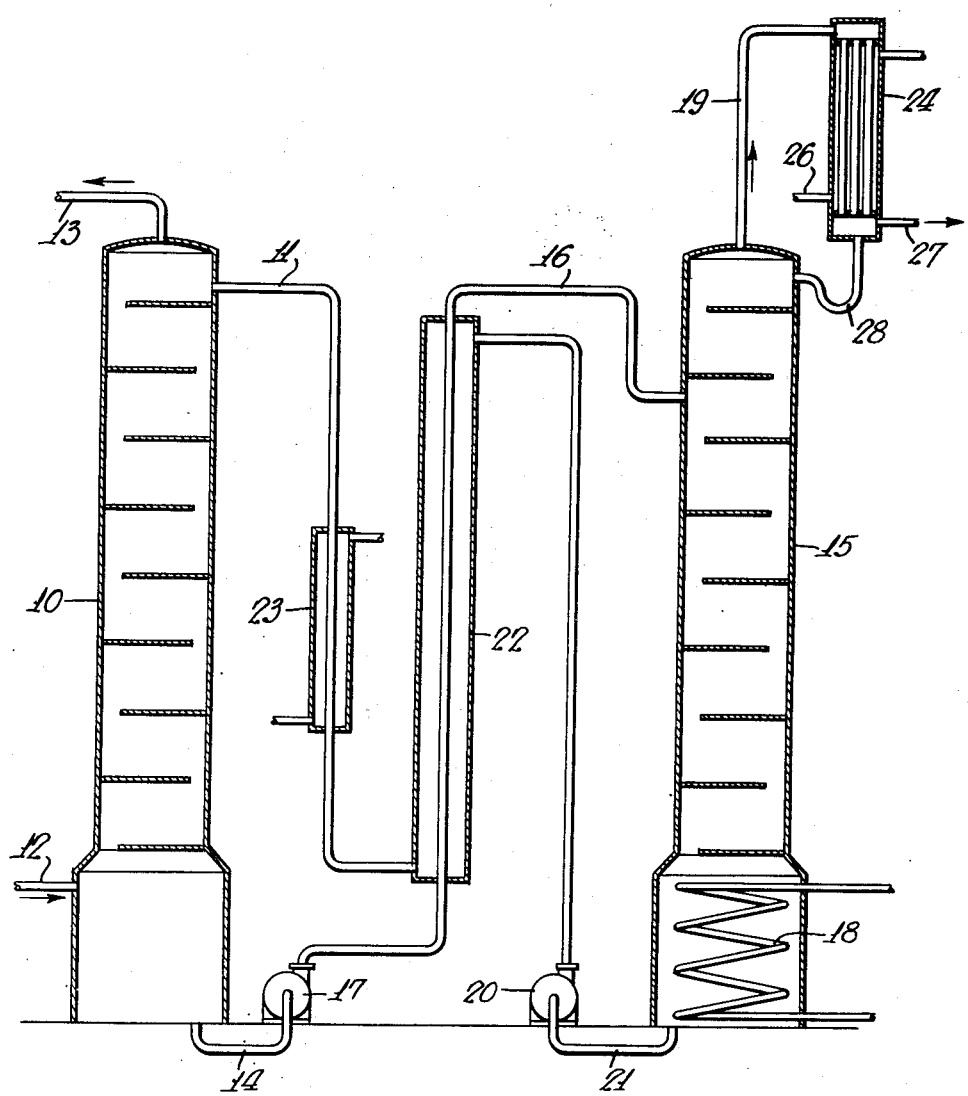
INVENTOR
Robert Roger Bottoms
BY
ATTORNEYS Patented Dec. 1, 1931

1,834,016

UNITED STATES PATENT OFFICE

ROBERT ROGER BOTTOMS, OF LOUISVILLE, KENTUCKY, ASSIGNOR TO THE GIRDLER CORPORATION, OF LOUISVILLE, KENTUCKY, A CORPORATION OF DELAWARE

PROCESS FOR SEPARATING ACIDIC GASES

Application filed October 15, 1930. Serial No. 488,740.

This application is a substitution for and continuation in part of my prior allowed application Serial No. 323,723, filed Dec. 4, 1928, allowed Sept. 26, 1930.

This invention relates to the separation of acidic gases from other gases or gaseous mixtures, by means of an absorbent agent. By the term "acidic gases" I mean those gases which in water solution have an acid reaction, but which are released unchanged upon sufficient heating of the water. Carbon dioxide, sulphur dioxide and hydrogen sulphide are the main gases of this type which are present in the gaseous mixtures commonly encountered in industrial operations.

The process may be employed for the separation and recovery of these acidic gases from the mixture, or may be employed to purify other gases by removal of said acidic gases therefrom.

The main objects of my invention are to facilitate the separation, effect complete or more nearly complete removal or recovery of said acidic gases, facilitate the regeneration of the absorbent agent, and to increase the rate of such regeneration. To secure these objects I employ an absorbent agent which, in comparison with the usual alkaline carbonates, such as sodium carbonate, has greater solubility and greater absorption capacity per unit of volume, whereby a smaller amount of the absorbent is needed and smaller and cheaper apparatus required for the treatment of a given volume of gas. I employ an absorbent agent which produces products with the acidic gases which are highly soluble and readily decomposed upon heating.

I have discovered that certain organic nitrogen compounds of the class known as amines may be employed for this purpose. An amine may be considered as an ammonia substitution compound in which one or more of the hydrogen atoms of the ammonia are replaced by a group containing carbon and hydrogen.

The use of this broad class of compounds in connection with an inorganic base has been suggested for this purpose and certain specific compounds have been suggested for removing certain specific gases, such as aniline for removing $CS_2$, methylene blue and other dyestuffs for removing $H_2S$, with alternate oxidation and reduction, and solid hexamethylenetetramine for removing $SO_2$, but so far as I am aware it was not known prior to my invention that certain compounds forming a comparatively small group of the amines possessed the properties of chemically uniting with acidic gases at a comparatively low temperature range, giving up the gas in gaseous form at a higher temperature and at the same time becoming regenerated, and having a low vapor pressure during the absorption stage and also during the heating or gas liberating stage. The possession of these properties permits the absorption agent in liquid form to be circulated continuously in a closed cycle through the low temperature absorption and higher temperature regeneration stage, with comparatively slight loss of the absorbent agent, long life for the absorbent agent in circulation, minimizing of heat consumption through the use of heat interchangers, and the treatment of large volumes of gases for comparatively small volumes of the absorbent.

I have furthermore discovered that these properties are possessed only by those amines which have certain chemical characteristics as to arrangement of atoms and certain physical characteristics. The presence of oxygen in addition to nitrogen and hydrogen is not objectionable, but the oxygen must not be present in a carboxyl (COOH) group or a carbonyl (CO) group, although it may be present in a hydroxyl (OH) group. The amine must be either solid or liquid at ordinary room temperature, and must have a boiling point not substantially below 100° C. It must be soluble in water or other liquid which does not form a stable compound with the acidic gas or other gases associated therewith, and which has a boiling point not below the temperature of effective gas elimination.

I have discovered that certain of the amines in the class of unsymmetrical hydrazines possess the desired chemical and physical properties and are suitable for use in my improved process. Unsymmetrical hydrazines may be considered as amines in which one of the hydrogens of the $NH_2$ group is replaced by another $NH_2$ group. Examples are phenylhydrazine, ethylhydrazine, propylhydrazine and hydrazine hydroxide. Of these, it is more advantageous to use phenylhydrazine.

The compounds above referred to which are soluble in water are advantageously employed in aqueous solution or in the presence of water and may be employed either alone, of ordinary commercial purity, or two or more of the compounds may be used together in the same solution. Those which are not soluble in water or only soluble to a comparatively small extent may be used with some other liquid as the solvent and which does not have a boiling point below 100° C. For instance, as the solvent I may employ tetrahydronaphthalene which in itself does not chemically unite with the acidic gases.

All of the compounds above referred to will unite with acidic gases to form compounds which are comparatively stable and have a very low vapor pressure or dissociation pressure at atmospheric temperature and pressure. All such produced compounds are broken down by heat with the liberation of the acidic gas and the regeneration of the absorbent agent.

The compounds resulting from the chemical reaction with the acidic gases are comparatively unstable in a higher temperature range, for instance, in the vicinity of 100° C. In the process the carbon dioxide may be absorbed to the extent of forming either a carbonate or a bicarbonate and if the bicarbonate be formed the heating to effect dissociation may not drive off all of the carbon dioxide, but a portion may remain in the form of a carbonate. Therefore in referring to the various absorbent agents which may be employed I include not only the compounds named, but any carbonate which may be initially formed and thereafter serve as the absorbent for further carbon dioxide in the formation of a bicarbonate.

In all of these compounds the dissociation at the higher temperature results in the liberation of the acidic gas in gaseous form and the regeneration of the absorbent agent suitable for use in the absorption of further gas when cooled to the lower temperature.

The phenylhydrazine is easy to handle, has a negligible vapor pressure at 100° C., that is it is of low volatility so that there is the minimum of loss during absorption or regeneration, may be used at ordinary atmospheric conditions as to pressure and temperature, will effect complete removal or recovery of the carbon dioxide, sulphur dioxide or hydrogen sulphide or other acidic gases, may be regenerated at a comparatively high rate with minimum loss at steam temperature, and during regeneration gives up all or substantially all of the absorbed gas or gases. The compound is not caustic, and therefore is not harmful to use, and may be employed in processing equipment of ordinary materials. The removal of the gas is by actual chemical combination, and the regeneration restores the compound to its original form and composition. This absorbent agent is not decomposed at the temperature of regeneration, does not react with other gases ordinarily present in the industrial gases to be treated, has no objectionable odor, and does not impart any odor to the gases separated at the higher temperature or the stripped gases at the lower temperature.

The compounds which are formed with the acidic gases are comparatively stable at atmospheric temperature and the instability increases as the temperature rises, substantially all of the acidic gas being driven off at the boiling temperature of the liquid. The extent to which the absorbent agent is regenerated may vary in commercial practice depending upon the temperature in the regenerator and the time that the liquor is maintained in the high temperature range of the cycle.

The process may be carried out in various types of apparatus, and intermittently or continuously. In the accompanying drawing the single figure shows diagrammatically a vertical section through a form of apparatus which may be employed for a continuous process.

In this apparatus there is employed an absorber 10 which is preferably in the form of a column of suitable height and provided with baffles, pebbles, or other suitable filler, to effect reduced rate of flow and efficient contact of the down-flowing liquid and the up-flowing gas. Within the absorber is the absorbing agent, preferably phenylhydrazine in suitable solution. The absorbing agent is continuously delivered to the top of the absorber through a pipe 11, while the gas to be treated is delivered to the lower part through a pipe 12. The stripped gas is taken off from the top of the column through a pipe 13, while the absorbent, with the absorbed gases, is taken off from the bottom through a pipe 14.

In connection with the absorber there is employed a regenerator 15 which has suitable means for effecting intimate contact of the down-flowing absorbent agent carrying the absorbed gas and the up-flowing gas separated from the absorbent agent in the regenerator. The absorbent, carrying the absorbed gas, is conducted from the pipe 14 through a pipe 16, to the top of the regenerator, by means of a pump 17. In the bottom of the regenerator is a heating means, such for instance as a steam coil 18. The gas driven off from the absorbent agent in the regenerator is taken off from the top of the regenerator through a pipe 19, while a pump 20 withdraws the regenerated absorbent through a pipe 21 from the bottom of the regenerator and delivers it to the pipe 11 which leads to the top of the absorber. It is necessary that the temperature of the regenerator be higher than in the absorber. Thus it is desirable to heat the liquid delivered through the pipe 16 and to cool the liquid delivered through the pipe 11. This may be accomplished by any suitable form of heat interchanger 22. The liquid flowing from the bottom of the regenerator through the pipe 12 flows through this heat interchanger in one direction, while the saturated absorbent from the bottom of the absorption column passes through the heat interchanger in the opposite direction to the upper part of the regenerator. The pipe 11 between the bottom of the heat interchanger and the top of the absorption column may be provided with an additional cooler 23.

In carrying out the process, the gas to be treated is delivered through the pipe 12, and passes up through the absorber. The carbon dioxide, sulphur dioxide, or hydrogen sulphide, is removed by the action of the phenylhydrazine, and the stripped gas passes out the pipe 13. The phenylhydrazine with the absorbed gas is removed through the pipe 14, heated by the heater 18 and interchanger 22, and delivered near the top of the regenerator. Within the latter apparatus the liquid trickles down through to the bottom and gives up the absorbed gas which later escapes through the pipe 19. A further portion of the absorbed gas is removed by the heating coil 18, and the regenerated absorbent is cooled in the heat interchanger 22 and cooler 23 and returned for reuse in the absorber. Thus the process is a continuous one.

In some cases or with some absorbent agents the liquid in the regenerator may be heated to such a temperature that a small portion of the solvent or the organic nitrogen compound may be vaporized. To prevent loss it is preferable to add a condenser at the top of the regenerator. I have shown somewhat conventionally a condenser 24 in which a cooling liquid, such as water, is circulated around a series of pipes between a supply pipe 25 and an outlet pipe 26. The cooled acidic gases leave the condenser through a pipe 27, while all condensate comprising either the solvent or the organic nitrogen compound or both is returned through a trap 28 to the top of the regenerator.

My improved process may be employed for treating a wide variety of gases. Merely as an example, stack gases may be treated for the recovery of the carbon dioxide contained therein, or gases from roasting furnaces may be treated to recover sulphur dioxide. In both such cases the treatment is for the recovery of the valuable constituents of waste gases. On the other hand, it may be used in treating natural gas, city gas, refinery gas, water gas or hydrogen, for the removal of carbon dioxide, sulphur dioxide, or other gases with acidic qualities, in order to purify the gases treated and render them better suited for the purposes for which they are to be employed.

Carbon dioxide may be removed from natural gas preparatory to extracting helium from the latter, or carbon dioxide may be removed from air preparatory to liquefaction of the latter and extraction of the oxygen. Where hydrogen if produced from coke, this hydrogen may be treated to remove such hydrogen sulphide as is often present in appreciable quantities and constitutes a very undesirable impurity of the hydrogen.

It will, of course, be obvious that the apparatus referred to is merely conventionally illustrated and may vary in detail through very wide limits and may embody suitable units of a character well known in the industry.

The size and capacity of the apparatus, as well as the nature of the means employed for effecting absorbing or regenerating action, may vary within comparatively wide limits, depending upon the character and volume of the gas treated and the percentage of the constituent which is to be removed. With phenylhydrazine in 50% solution as the absorbing agent, steam serves as a suitable heating agent in the heating coil 18, while water of ordinary temperature may be employed in the cooler 23 and condenser 24. In some cases, and particularly with some other amino compounds, it may be desirable to heat to a higher temperature by means of superheated steam, and cool to a lower temperature by the action of brine, while with others less heating and less cooling is required. With phenylhydrazine no excessive heating or cooling action is required.

Due to the high rate of absorption and the high rate of regeneration, the columns of the absorber and regenerator may be made very much shorter than is possible when other materials such as alkalies or carbonates are used as the absorbing agent. Substantially complete regeneration may be obtained without either vigorous boiling or blowing with air, as is now required with some absorbing agents.

In my improved process it is neither necessary nor desirable to use any inorganic bases. Such bases may in some cases have a very deleterious effect upon the amine employed. In some cases the presence of a small amount of sodium carbonate or other such inorganic compound might not do any harm, but the addition would not, so far as I know, serve any useful purpose.

Having thus described my invention what

I claim as new and desire to secure by Letters Patent is:

1. The process of separating acidic gases from gaseous mixtures, which includes effecting intimate contact of the gaseous mixture with an absorbent in liquid form including an unsymmetrical hydrazine which is free of carboxyl and carbonyl groups, and which has a boiling point not substantially below 100° C.

2. The process of separating carbon dioxide, sulphur dioxide or hydrogen sulphide, or other acidic gases from gaseous mixtures, which includes effecting intimate contact of the gaseous mixture with a hydrazine having an attached carbon ring.

3. The process of separating carbon dioxide, sulphur dioxide or hydrogen sulphide, or other acidic gases from gaseous mixtures, which includes effecting intimate contact of the gaseous mixture with phenylhydrazine.

4. The process of separating carbon dioxide, sulphur dioxide or hydrogen sulphide, or other acidic gases from gaseous mixtures, which includes effecting intimate contact of the gaseous mixture with hydrazine hydroxide.

5. The process of separating acidic gases from gaseous mixtures, which includes effecting intimate contact of the gaseous mixture with an absorbent agent including phenylhydrazine, and thereafter heating said absorbent agents to separate therefrom the absorbed gases.

6. The process of separating acidic gases from gaseous mixtures, which includes effecting intimate contact of the gaseous mixture with an absorbent agent including hydrazine hydroxide, and thereafter heating said absorbent agent to separate therefrom the absorbed gases.

7. The process of treating a gaseous mixture, including carbon dioxide, sulphur dioxide, hydrogen sulphide or other acidic gases which includes circulating a solution of phenylhydrazine in a closed cycle, passing the gaseous mixture to be treated in contact with said solution at one point in the cycle and heating the solution to remove the absorbed gases at another point in the cycle.

Signed at New York, in the county of New York and State of New York, this 3rd day of October, A. D. 1930.

ROBERT ROGER BOTTOMS.